UNITED STATES PATENT OFFICE.

HARRY HOWARD STOUT, OF DOUGLAS, ARIZONA, ASSIGNOR OF FIFTY-FIVE PER CENT. TO PHELPS DODGE CORPORATION, A CORPORATION OF NEW YORK.

PROCESS OF CLEANING CONVERTER-SLAG.

1,372,047. Specification of Letters Patent. Patented Mar. 22, 1921.

No Drawing. Application filed February 3, 1919. Serial No. 274,828.

*To all whom it may concern:*

Be it known that I, HARRY HOWARD STOUT, a citizen of the United States, residing at Douglas, in the county of Cochise and State of Arizona, have invented certain new and useful Improvements in Processes of Cleaning Converter-Slag, of which the following is a specification.

It is a well known fact that in the metallurgy of copper, converter slag as run from the converter carries with it a greater or less amount of copper and with the object in view of recovering this copper, which would otherwise be a waste, the slag is treated in the reverberatory matting furnace by pouring it into the reverberatory slag. As a rule, however, the results obtained are by no means satisfactory.

That the recovery of the copper from the converter slag through this process of treatment has been imperfect is, I have discovered, due to several reasons. The slag produced in the converting process is low in silica and, being low in silica, has a higher specific gravity than the normal reverberatory slag into which it is to be poured. Consequently when the converter slag is poured into the reverberatory slag in the copper matting furnace, stratification of the two molten slags of different specific gravities takes place, and since there is no practical method of mixing them while in this highly fused state, the removal of the copper content of the converter slag is very imperfectly accomplished. Also, due to the fact that converter slag is low in its silica content, there is formed in the conveyer large quantities of magnetic iron oxid which, of itself, is a carrier of copper and which when formed will not combine with any new slag, so that large quantities of copper are carried away thereby.

The desirability of recovering or extracting from the converter slag as nearly as possible all of its copper content is well recognized and it is with such maximum recovery that the present invention has to deal.

It has been the common practice for a great many years to run converter slags low in silica content. A converter slag low in silica, and therefore high in specific gravity, will preclude the settling out of the copper matte prills held in suspension and therefore reverberatory slags have been run high in silica, with a consequent low specific gravity, so as to facilitate the separation of the suspended matte prills when the converter slag is poured into and treated with the reverberatory slag in the reverberatory matting furnace, and to accomplish this attempts have been made to mix in the reverberatory furnace the molten converter slag low in silica content, when poured into the furnace, with ore simultaneously poured into the furnace and intended to supply the deficiency in silica. Any ore employed for this purpose must be of a composition such that the contained bases combining with the silica content will leave an excess of silica remaining to combine with the molten converter slag introduced into the reverberatory furnace. However, all attempts to mix the molten converter slag with ores containing an excess of silica, within the limits of the reverberatory furnace have proved a failure.

I have discovered that if converter slag having approximately the same percentage of silica content as the reverberatory slag into which it is to be poured, and therefore having approximately the same specific gravity as the reverberatory slag into which it is to be poured, is employed in the manner heretofore recited, namely, by being poured into the reverberatory slag in the matting furnace, stratification of the two slags will not take place and the resulting mixture will be a homogeneous one. By "approximately" I mean the same as or within reasonable limits above or below. If others have heretofore in fact had in view this principle, when they have, as above recited, attempted to supply the deficiency in silica by pouring ore into the reverberatory furnace simultaneously with the converter slag, they have, as also above pointed out, failed to accomplish the desired result for attempts to mix the molten converter slag with ores containing an excess of silica within the limits of the reverberatory furnace must prove a failure. To satisfy the condition that there will be no stratification of the slags when the converter slag is poured, the two slags must have the same or approximately the same specific gravity, and, it naturally follows, must have the same or approximately the same percentage of silica content.

In carrying out my invention I produce in the converter a slag high in its silica content, as clearly distinguished from the low silica slag heretofore produced and which, as a matter of fact, contains, within reasonable limits, the same percentage of silica as the slag formed in the reverberatory furnace. Having produced such a converter slag I proceed in the usual manner by pouring the slag into the slag in the reverberatory copper matting furnace, and I have found and demonstrated that because I have at the outstart produced in the converter a slag having approximately the same specific gravity and percentage of silica content as the reverberatory slag into which it is to be poured, I am enabled to obtain, upon such pouring and subsequent treatment, in the usual manner, substantially complete extraction or recovery of the copper content of the converter slag.

Having thus described the invention, what is claimed as new is:

1. In a process of cleaning converter slag of its copper content, in which process the converter slag is poured molten into the reverberatory slag, the forming in the converter of a slag of approximately the same specific gravity and having approximately the same percentage of silica content as the reverberatory slag.

2. The process of cleaning converter slag of its copper content in the reverberatory furnace which comprises producing a converter slag of approximately the same specific gravity as the slag in the reverberatory furnace, and introducing the converter slag into the reverberatory slag.

In testimony whereof I affix my signature.

HARRY HOWARD STOUT.